May 13, 1952     O. V. ANDERSON     2,596,357
CUFF LINK
Filed Jan. 31, 1951
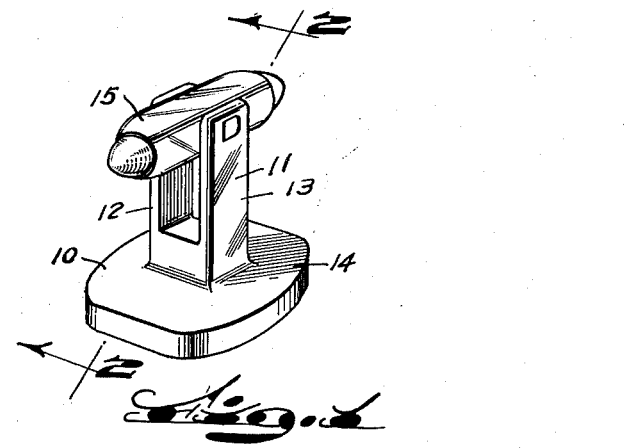
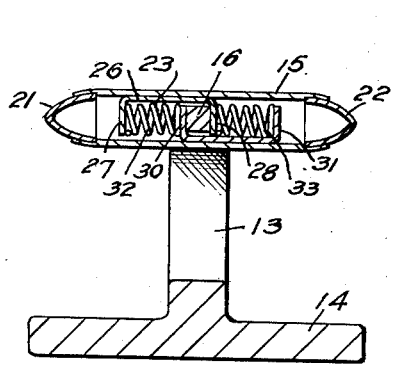
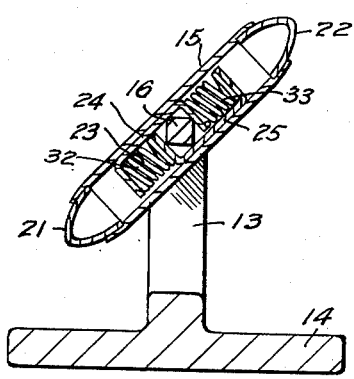
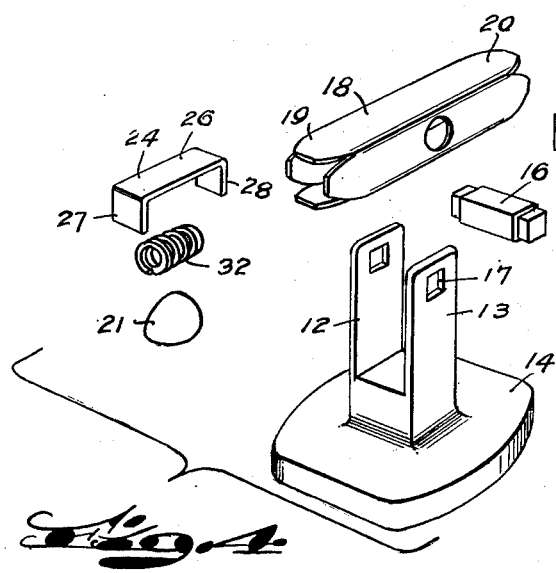
INVENTOR.
Olof V. Anderson
BY Nathaniel Frucht
attorney Patented May 13, 1952

2,596,357

UNITED STATES PATENT OFFICE 2,596,357

CUFF LINK

Olof V. Anderson, Cowesett, R. I., assignor to Anson, Inc., a corporation of Rhode Island Application January 31, 1951, Serial No. 208,720

2 Claims. (Cl. 24—97)

The present invention relates to the jewelry art, and has particular reference to a novel construction for a cuff link.

The principal object of the invention is to provide a novel construction for a cuff link of the snap retainer head type.

Another object of the invention is to provide a novel spring assembly for a cuff link retainer head.

With the above and other objects and advantageous features in view, the invention consists of a novel arrangement of parts more fully disclosed in the detailed description following, in conjunction with the accompanying drawings, and more specifically defined in the claims appended thereto.

In the drawings,

Fig. 1 is a perspective view of an illustrative cuff link embodying the invention;

Fig. 2 is a vertical section on the line 2—2 of Fig. 1;

Fig. 3 is a view similar to Fig. 2, the retainer head being turned; and

Fig. 4 is an exploded view of the cuff link parts.

It has been found desirable to devise a compact spring assembly for a cuff-link of the snap retainer head type, to facilitate manufacture and mounting of the parts, to increase the snap action, and to lengthen the effective life of the cuff link parts. To this end, I provide a hollow shell for the retainer head, in which I place a spring assembly consisting of two interengaging housing members having pivot contacting elements which are spring urged towards each other.

Referring to the drawings, the cuff link 10 includes a U-shaped shank 11 having spaced arms 12, 13, a fixed ornamental head 14 mounted on the lower portion of the U-shaped shank, and a snap retainer head 15 pivotally mounted on a square pivot bar 16 reduced at its ends and secured in square openings 17 in the free ends of the arms 12, 13. The retainer head 15, see Fig. 4, includes a rectangular shell 18 with its ends 19, 20 cut to receive closure ornaments 21, 22, a spring assembly 23 being mounted in the head 15 to snap engage the sides of the pivot bar 16.

The spring assembly 23 includes two elongated U-shaped brackets 24, 25, the bracket 24 having a base 26 and ends 27, 28 and the bracket 25 having a base 29 and ends 30, 31, and two compression springs 32, 33, which are assembled so that the brackets are in reverse relation with their contiguous ends 27, 30 in overlapping arrangement, the springs 32, 33 seating on the bases 26, 29 between the ends 28, 31 as illustrated, whereby the square pivot bar 16 is positioned between the overlapped bracket ends 28 and 30.

When the retainer head 15 is turned forty-five degrees, see Fig. 3, the springs are compressed, so that the retainer head will snap to either a horizontal or a vertical position with relation to the fixed head. Since the pivot bar sides press against bracket ends, there is no excessive wear; the springs can be made highly resilient, as they are not of extended length, and the spring assembly can be inserted in the retainer head as a unit, as pressure on the outside bracket ends opens the center space between the inner bracket ends to permit insertion of the pivot bar, which is then snapped into the retaining openings 17 in the arms 12, 13.

Although I have disclosed a specific embodiment of my invention, it is obvious that changes in the size, shape and arrangement of the parts may be made to meet the requirements for different cuff link designs, without departing from the spirit or the scope of the invention as defined in the appended claims.

I claim:

1. In a cuff link, a shank having spaced arms, a pivot bar of square formation bridging said arms, a retainer head rotatably mounted on said pivot bar, and a spring assembly in said head comprising two brackets each having inner and outer ends, said brackets having their inner ends in overlapped relation with the pivot bar in-between, and a coil spring in each bracket respectively engaging the bracket outer end and the overlapped inner end of the other bracket.

2. In a cuff link, a shank having spaced arms, a pivot bar of square formation bridging said arms, a retainer head rotatably mounted on said pivot bar, and a spring assembly in said head comprising two U-shaped brackets each having inner and outer ends, said brackets having their inner ends in overlapped relation with the pivot bar in-between, and a coil spring in each bracket respectively engaging the bracket outer end and the overlapped inner end of the other bracket.

OLOF V. ANDERSON.

No references cited.